(12) United States Patent
Saenz Gonzalo et al.

(10) Patent No.: US 12,534,080 B2
(45) Date of Patent: Jan. 27, 2026

(54) MOTOR VEHICLE WITH HILL DESCENT CONTROL FUNCTION WHICH CAN BE ENABLED BY A DEDICATED COMMAND AND ENABLEMENT PROCESS OF THE HILL DESCENT CONTROL FUNCTION

(71) Applicant: FERRARI S.P.A., Modena (IT)

(72) Inventors: Alberto Saenz Gonzalo, Modena (IT); Giorgio Cucciolla, Modena (IT); Alberto Franco, Modena (IT); Flavio Gargiulo, Modena (IT); Simone Stefano Manazza, Modena (IT); Andrea Secondi, Modena (IT); Marco Tammaro, Modena (IT)

(73) Assignee: FERRARI S.P.A. (IT)

( * ) Notice: Subject to any disclaimer, the term of this patent is extended or adjusted under 35 U.S.C. 154(b) by 0 days.

(21) Appl. No.: 19/067,534

(22) Filed: Feb. 28, 2025

(65) Prior Publication Data
US 2025/0282356 A1    Sep. 11, 2025

(30) Foreign Application Priority Data
Mar. 8, 2024  (IT) .................. 102024000005287

(51) Int. Cl.
*B60W 30/18* (2012.01)
*B60W 50/14* (2020.01)
*B62D 1/04* (2006.01)

(52) U.S. Cl.
CPC ....... *B60W 30/18009* (2013.01); *B62D 1/046* (2013.01); *B60W 30/18072* (2013.01); *B60W 2050/146* (2013.01); *B60W 2510/20* (2013.01)

(58) Field of Classification Search
CPC ..... B60W 30/18072; B60W 30/18009; B60W 2050/146; B60W 2510/20; B62D 1/046; B60T 7/12; B60T 7/22; B60L 15/2009; B60L 15/2018; B60L 15/2027
See application file for complete search history.

(56) References Cited

U.S. PATENT DOCUMENTS

| 2014/0316670 A1 | 10/2014 | Krauss |
| 2016/0244059 A1 | 8/2016 | Fairgrieve et al. |
| 2019/0291769 A1 | 9/2019 | Kim et al. |
| 2022/0089024 A1 | 3/2022 | Aoyama |

FOREIGN PATENT DOCUMENTS

| GB | 2559172 A | * | 8/2018 | ................ B60T 7/12 |
| WO | WO-2015165759 A1 | * | 11/2015 | ............ B60W 50/10 |
| WO | 2018134153 A1 | | 7/2018 | |

OTHER PUBLICATIONS

Examiner Maciej Bak, Italian Search Report and Written Opinion, Italian Patent Application IT 102024000005287, Completion Date Sep. 19, 2024, 6 pp.

* cited by examiner

*Primary Examiner* — Tinh Dang
(74) *Attorney, Agent, or Firm* — The Belles Group, P.C.

(57) ABSTRACT

A motor vehicle including a steering wheel comprising a touch-sensitive portion, a user interface comprising a control device for triggering an enablement of a hill descent control function, and a control unit coupled to the steering wheel and to the user interface is disclosed. The control unit is configured to detect the enablement of the hill descent control function by the control device and to start the hill descent control function in response to a touch on the touch-sensitive portion by a driver of the motor vehicle, provided that the hill descent control function is enabled.

20 Claims, 6 Drawing Sheets

MOTOR VEHICLE WITH HILL DESCENT CONTROL FUNCTION WHICH CAN BE ENABLED BY A DEDICATED COMMAND AND ENABLEMENT PROCESS OF THE HILL DESCENT CONTROL FUNCTION

CROSS-REFERENCE TO RELATED APPLICATION

This patent application claims priority from Italian patent application no. 102024000005287 filed on Mar. 8, 2024, the entire disclosure of which is incorporated herein by reference.

TECHNICAL FIELD

The invention relates to a motor vehicle with a hill descent control function. The invention further relates to a process for enabling the hill descent control function during the use of the motor vehicle.

BACKGROUND

In motor vehicle technology, hill descent control is a well-known function that assists the driver in the descent by autonomously controlling the travel speed of the motor vehicle under gravity acceleration, that is, without the driver intervening on the brake pedal. In particular, hill descent control permits the setting of a constant value of the travel speed during a descent, so that the function controls the braking system of the motor vehicle such that the actual travel speed converges towards and stabilizes on the set constant value.

A hill descent control apparatus is an apparatus that applies the hill descent control to the motor vehicle and includes at least one control unit configured to perform or start the hill descent control by controlling the braking system of the motor vehicle, for example based on acquired signals indicative of the actual travel speed and, if necessary, of the slope of the descent travelled by the motor vehicle. The braking system controlled by the control unit can include brakes applied to the wheels, as well as an engine braking assembly for adjusting the braking action that is exerted upon the wheels by the propulsion assembly of the motor vehicle.

The hill descent control can be activated by the driver, if the motor vehicle is actually descending with a speed not exceeding a threshold, by means of an activation control, which can include a button, a lever, a knob, a touch pad and the like. The activation control is located near the steering wheel, so that it can be easily and quickly reached by the driver through the use of the hands, without the driver having to change posture or abandon the manual control of the steering wheel for a long time. This activation control is usually added to many other controls, which must have the same reachability characteristics, to activate or control further functions of the vehicle, whose use normally is much more frequent than that of the hill descent control. This typically results in an overcrowding of controls near the steering wheel, which can lead to a slight sense of disorientation of the driver as well as to a reduction in the aesthetic appeal of the steering wheel area, which normally rather requires a high aesthetic cleanliness and a sense of minimalism typically associated with the simplicity and overall effectiveness of the functions of the motor vehicle.

Therefore, there generally is a need to identify a potential improved allocation of the controls on the steering wheel, compared to known motor vehicle models. More in particular, the reachability of a particular control by the driver needs to be associated with the frequency of use of the function activated or controlled by that particular control. This especially applies to functions that, like the hill descent control, are particularly appreciated only by specific groups of users, for example those who routinely travel on mountain roads or on roads having frequent sections with significant slopes.

In the light of the above, the object of the invention is to fulfil the need discussed above, preferably in a simple and reliable fashion.

DESCRIPTION OF THE INVENTION

In one form, the invention can be a motor vehicle comprising a steering wheel comprising a touch-sensitive portion, a user interface comprising a control device for commanding an enablement of a hill descent control function, and a control unit coupled to the steering wheel and the user interface, as well as configured to detect the enablement of the hill descent control function by the control device and to start the hill descent control function in response to a touch on the touch-sensitive portion by a driver of the motor vehicle, provided that the hill descent control function is enabled.

In one form, the invention can be a process for enabling a hill descent control function on a motor vehicle, the process comprising the steps of detecting the enablement of the hill descent control function by a control device of a user interface of the motor vehicle, and only as a result thereof, and allowing the hill descent function to be started by a touch of a driver of the motor vehicle on a touch-sensitive portion of a screen forming part of a steering wheel of the motor vehicle.

In one form, the invention can be a motor vehicle comprising a steering wheel comprising a touch-sensitive portion, a control device configured to command an enablement of a hill descent control function, and an electronic control unit configured to implement the hill descent control function once the command from the control device has been received and a touch on the touch-sensitive portion by a driver of the motor vehicle has been detected.

BRIEF DESCRIPTION OF THE DRAWINGS

The invention will now be described hereinafter with reference to the accompanying drawings, which show a non-limiting embodiment thereof, wherein.

DETAILED DESCRIPTION OF THE INVENTION

Figure 1:
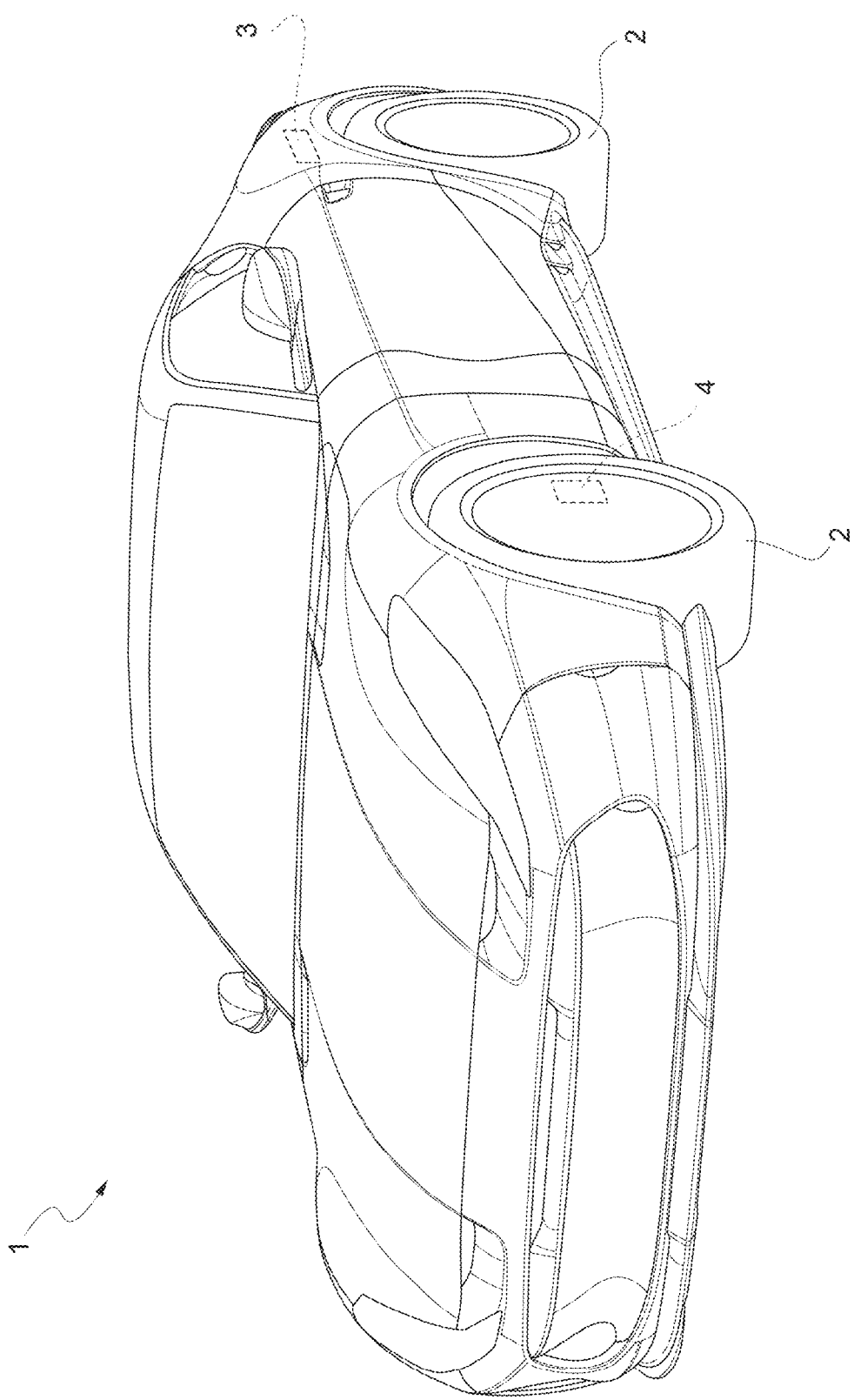
FIG. 1 is a perspective view of a motor vehicle according to the invention.

In FIG. 1, reference number 1 indicates, as a whole, a vehicle or, more precisely, a motor vehicle.

The motor vehicle 1 comprises a plurality of wheels 2, only two of them being visible in FIG. 1.

Furthermore, the motor vehicle 1 comprises a propulsion device 3, which is schematically shown and can be controlled so as to accelerate the motor vehicle 1. The propulsion device 3, which could comprise an electric motor and/or a heat engine, is connected to the wheels 2 so as to cause them to rotate, thus enabling the acceleration and, therefore, the forward movement of the motor vehicle 1.

Furthermore, the motor vehicle 1 comprises a braking device 4, which is shown in FIG. 1 in a merely schematic form in the area of one of the visible wheels 2.

This is not limiting, as the braking device 4 could be applied to one or more wheels 2, for example to the front wheels and/or to the rear wheels, without losing generality.

The braking device 4 is configured to brake the motor vehicle 1, in particular under the control of the driver.

The braking device 4 can comprise a device known per se; for example, the braking device 4 can comprise a disc brake or other known types of brake and, if necessary, a servo-actuator, for example of the hydraulic type, which can be controlled so as to operate the brake in known ways, which, therefore, are not described in detail.

Furthermore, the braking device 4 can comprise devices for exerting engine braking actions upon the wheels 2, such as, for example, an automatic transmission unit forming part of a transmission assembly between the propulsion device 3 and the wheels and controllable so as to downshift, thereby increasing an engine braking effect upon the wheels 2, or a proportional shut-off valve on the exhaust duct of a turbocharger of the heat engine of the propulsion device 3.

The braking device 4 could comprise the electric motor of the propulsion device 3, as the electric motor can perform a braking function when it is controlled so as to act as an electric generator.

Furthermore, the motor vehicle 1 comprises a steering wheel 6 for steering at least two of the wheels 2; in turn, the steering wheel 6 comprises a support portion 7 and a rotary portion 8 capable of rotating with respect to the support portion 7 around a straight axis.

The rotary portion 8 is an adjustment member configured to adjust the steering of the wheels 2 with its rotation, in particular in manner that is proportional to or increases with the angle of rotation of the rotary portion 8.

The steering wheel 6 or, more in particular, the rotary portion 8 comprises a screen or an interface 9, or, more generally, a component having a touch-sensitive portion 10.

Touch-sensitive portion 10 means a portion provided with a surface 12 that can be touched by the driver and with at least one sensor (not shown) configured to detect a touch of the driver on the surface 12 and generate a corresponding signal indicative of the detected touch.

The motor vehicle 1 further comprises a user interface 13, recognizable in particular in the field as HMI (acronym for Human Machine Interface). Preferably, the user interface 13 is separate from the steering wheel 6, namely spaced apart or isolated from the steering wheel 6.

For example, the user interface 13 is configured to perform a plurality of functions, such as, for example, controlling an information and/or entertainment (infotainment) assembly of the motor vehicle 1, namely controlling sources (e.g. multimedia sources) including by way of example, but not limited to, one or more of a satellite navigation device, a car radio, a telephone interface, a television device and the like.

The user interface 13 has or comprises a control device 14, which can be used by the driver to control an enablement of a hill descent control function, hereinafter indicated by the abbreviation HDC, for the motor vehicle 1.

As explained more in detail below, the HDC function can be performed or started by a control unit ECU of the motor vehicle 1 and comprises or, in other words, is the execution of a control of the travel speed or, more simply, of the speed of the motor vehicle 1.

The control unit ECU is coupled to the user interface 13 and is configured to detect the enablement of the HDC function by means of the control device 14.

Preferably, the enablement of the HDC function can only and exclusively be performed by the control device 14. In other words, if the driver does not voluntarily decide to enable the HDC function through the control device 14, the HDC function cannot be enabled in other alternative ways.

The enablement of the HDC function is a first necessary (but, in particular, not sufficient) condition for the control unit ECU to perform or start the HDC function itself. In other words, the control unit ECU can start or perform the HDC function only if it detects the enablement of the HDC function.

Figure 2:
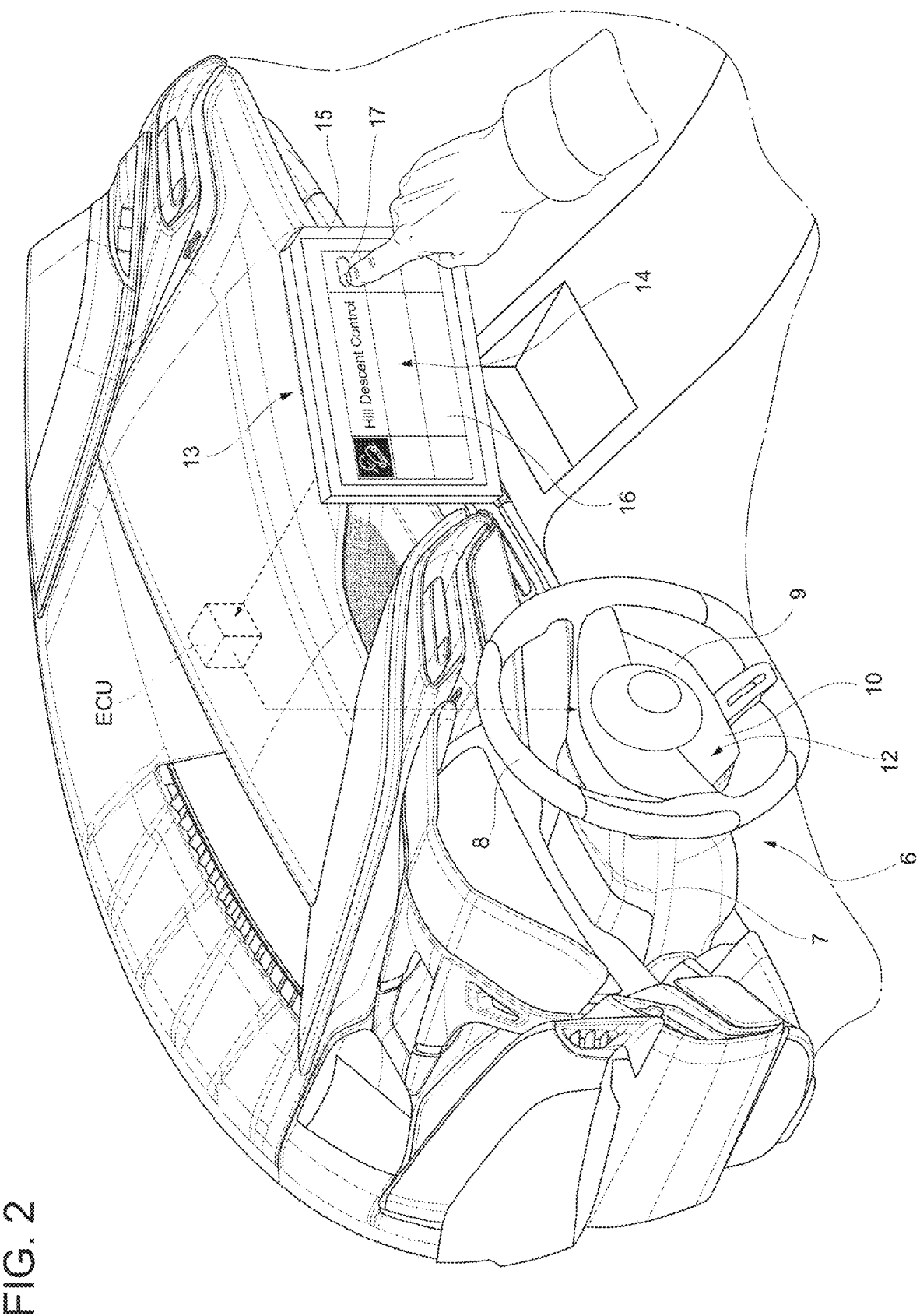
FIG. 2 is a perspective view, on a larger scale, of the inside of the motor vehicle of FIG. 1.

More in detail, as shown for example in FIG. 2, the user interface 13 comprises a screen 15 for displaying a setting menu 16, which is part of the control device 14.

Specifically, the control device 14 comprises a controller 17, which is configured to cooperate with the setting menu 16 to enable the HDC function.

More in particular, the controller 17 could be configured to allow users to scroll through the setting menu 16 and, optionally, to also enter an enablement instruction through the setting menu 16, which is received by the control unit ECU. The latter then enables the HDC function in response to receiving the enablement instruction.

To be clear, the controller 17 is not necessarily limited to a single controller of a specific type, but it could rather include a plurality of sub-controllers, possibly of several types.

For example, according to an embodiment which is not shown herein, the controller 17 could be a physical controller such as a button, a lever and the like. Alternatively, the controller 17 could be of the vocal, magnetic, optical type, etcetera, without losing generality.

Alternatively or in addition, as shown for example in the drawings, the controller 17 could be part of the setting menu 16.

Specifically, the screen 15 is sensitive to touch, so that the controller 17 is a touch controller of the setting menu 16 displayed on the screen 15.

Figure 4:
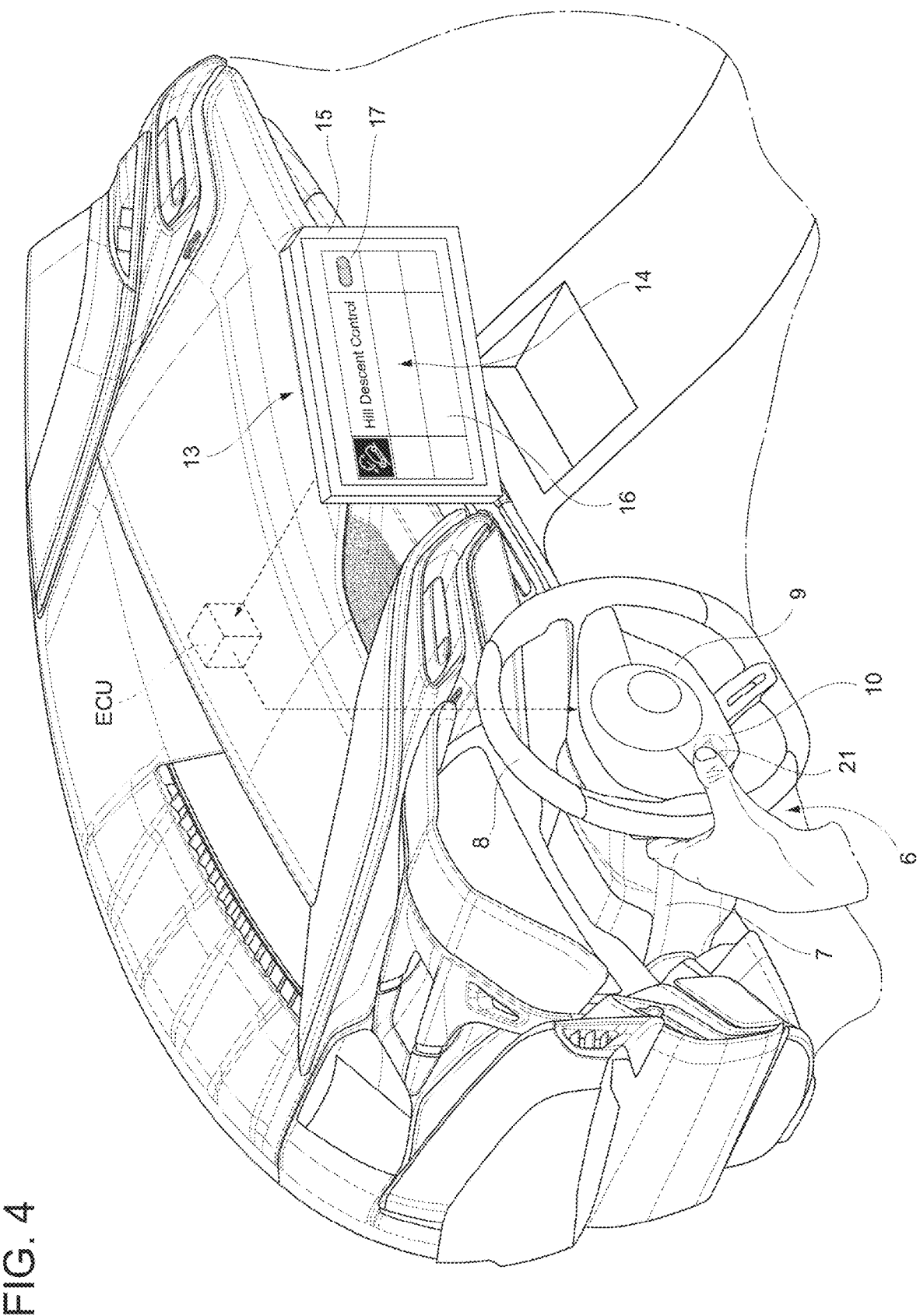
FIG. 4 is similar to FIG. 3 and shows the driver activating the hill descent control function by means of a controller that appeared following the enablement thereof through the setting menu.

Once the HDC function is enabled, namely only if or under the condition that the HDC function is enabled (in other words, the enablement has taken place or is detected by the control unit ECU), the control unit ECU is configured to start or perform the HDC function in response to a touch on the touch-sensitive portion 10, in particular by the driver (FIG. 4).

In particular, the start or execution of the HDC function can only and exclusively be performed by the touch-sensitive portion 10, i.e., more precisely, by touching the touch-sensitive portion 10.

In addition to the condition that the HDC function has to be enabled, the start of the HDC function can only be successful if or under the condition that specific predetermined operating conditions of the motor vehicle 1 occur.

The control unit ECU is configured to check whether the specific operating conditions of the motor vehicle 1 actually occur and to finalise the start of the HDC function, i.e. successfully start the HDC function, if the specific operating conditions are met. Otherwise, the start of the HDC function is unsuccessful; in other words, the control unit ECU is configured to abort the start of the HDC function if the specific operating conditions are not met.

The specific operating conditions entail the fact that the motor vehicle 1 is going downhill, namely that the motor vehicle 1 is subjected to an acceleration along its travel direction due to gravity. More precisely, the specific operating conditions entail the fact that the slope of the road travelled by the motor vehicle 1 lies within a predetermined descent slope range, wherein, in particular, the minimum descent slope is greater than zero up to a maximum descent slope.

In addition, the specific operating conditions can include conditions concerning the travel speed or speed of the motor vehicle 1, which, for example, must lie within a predetermined speed range, in particular between a minimum threshold, for example less than 5 km/h but in any case not zero, and a maximum threshold, for example greater than 50 km/h.

Furthermore, the specific operating conditions can entail that the propulsion device 3 is actually coupled to the wheels 2, i.e. that the vehicle is in an engaged-gear state, or in a state of idle in motion, but not, for example, with the automatic transmission unit set to the parking state.

Furthermore, the specific operating conditions can entail that a cruise control function, for example of the adaptive type, is not activated or cannot be activated.

Once the HDC function is started or performed, the control unit ECU controls the speed of the motor vehicle 1 by setting a target value for the speed itself and by controlling at least one of the devices 3, 4 as a function of the set target value, in particular so that the actual speed is close to the target value.

More in particular, according to an embodiment, the control unit ECU controls the braking device 4 and not also the propulsion device 3 to control the speed of the motor vehicle 1.

The control takes place according to control law to minimize or reduce a difference or discrepancy between the actual value of the speed and the target value.

More precisely, the control law is configured to keep the speed of the motor vehicle 1 substantially constant and equal to the target value, in particular during the descent of the motor vehicle 1.

The law of control preferably is a closed-loop control law, but it could be an open-loop control law, without losing generality.

Preferably, when the HDC function is successfully started, the target value is set equal to the current value of the actual speed of the motor vehicle 1.

Alternatively or in addition, the target value can be set by the driver by means of a specific control of a known type and not shown herein.

Preferably, the motor vehicle 1 is equipped or is initially provided with the HDC function disabled and capable of being enabled by the driver through the control device 14.

Furthermore, the control device 14 can be used, for example by the driver, to disable the HDC function after it has been enabled by means of the same control device 14.

In particular, the HDC function can only and exclusively be disabled by the control device 14.

The control unit ECU is further configured to store a state of enablement or disablement of the HDC function by means of the control device 14, regardless of the operating conditions of the motor vehicle 1 or its subsequent use. Therefore, for example, if the motor vehicle 1 is turned off with the HDC function enabled, the control unit ECU continues to detect the enablement of the HDC function when the motor vehicle 1 is turned back on.

Preferably, the touch-sensitive portion 10 is part of the screen 9.

Figure 3:
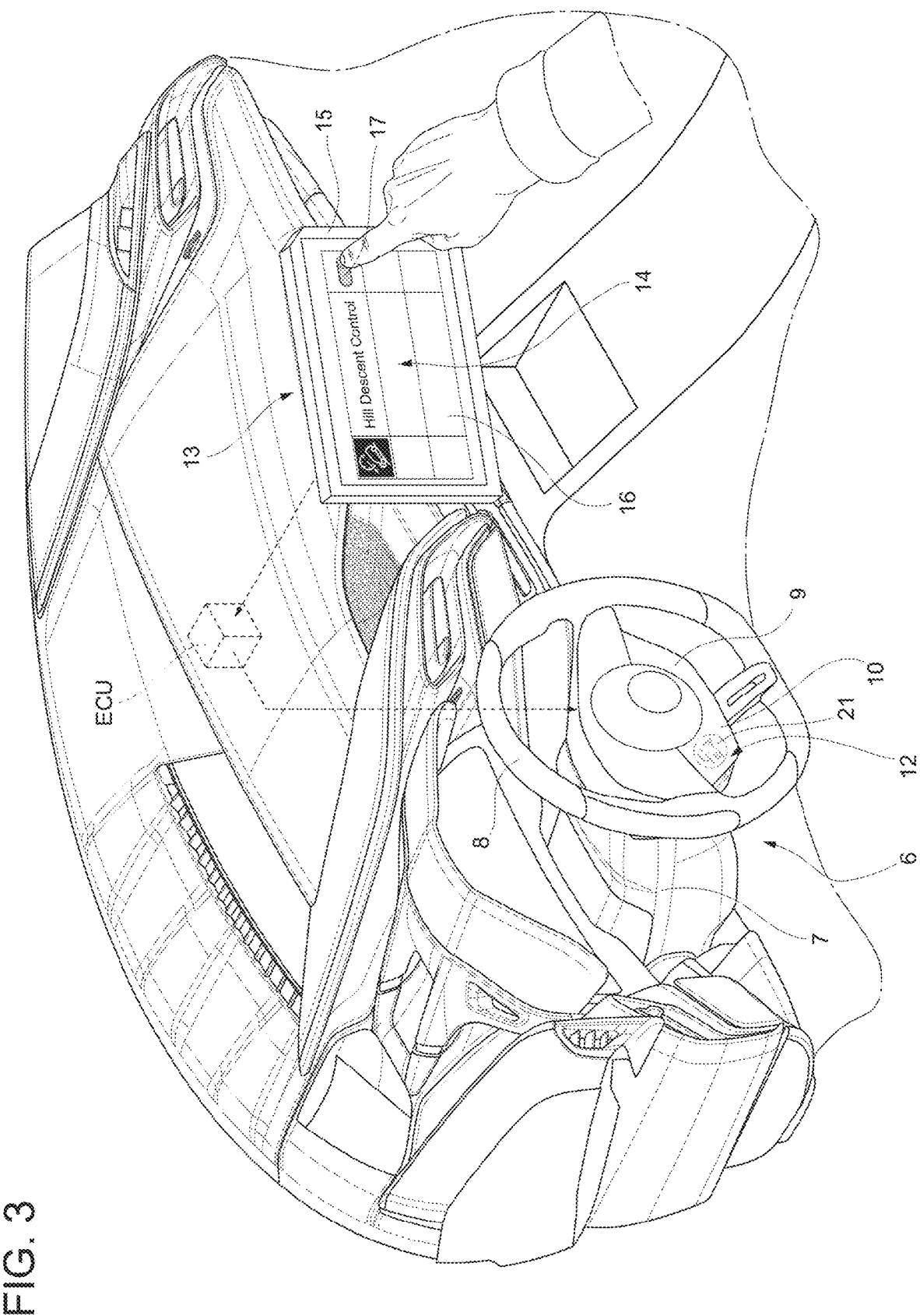
FIG. 3 is similar to FIG. 2 and shows a driver enabling a hill descent control function from a setting menu on the screen of a user interface of the motor vehicle.

The control unit ECU is configured, in particular, to cause an indicator 21 of the HDC function to appear on the screen 9, at the touch-sensitive portion 10, in response to the enablement of the HDC function (FIG. 3).

Basically, the control unit ECU causes the indicator 21 to light up when the HDC function is enabled by the control device 14.

The indicator 21 indicates the position of the touch-sensitive portion 10 on the screen 9.

For example, the indicator 21 can comprise a graphic icon, such as the typical graphic icon normally associated with the HDC function in the automotive industry, namely an icon representing a motor vehicle in descent with an associated speedometer.

Figure 5:
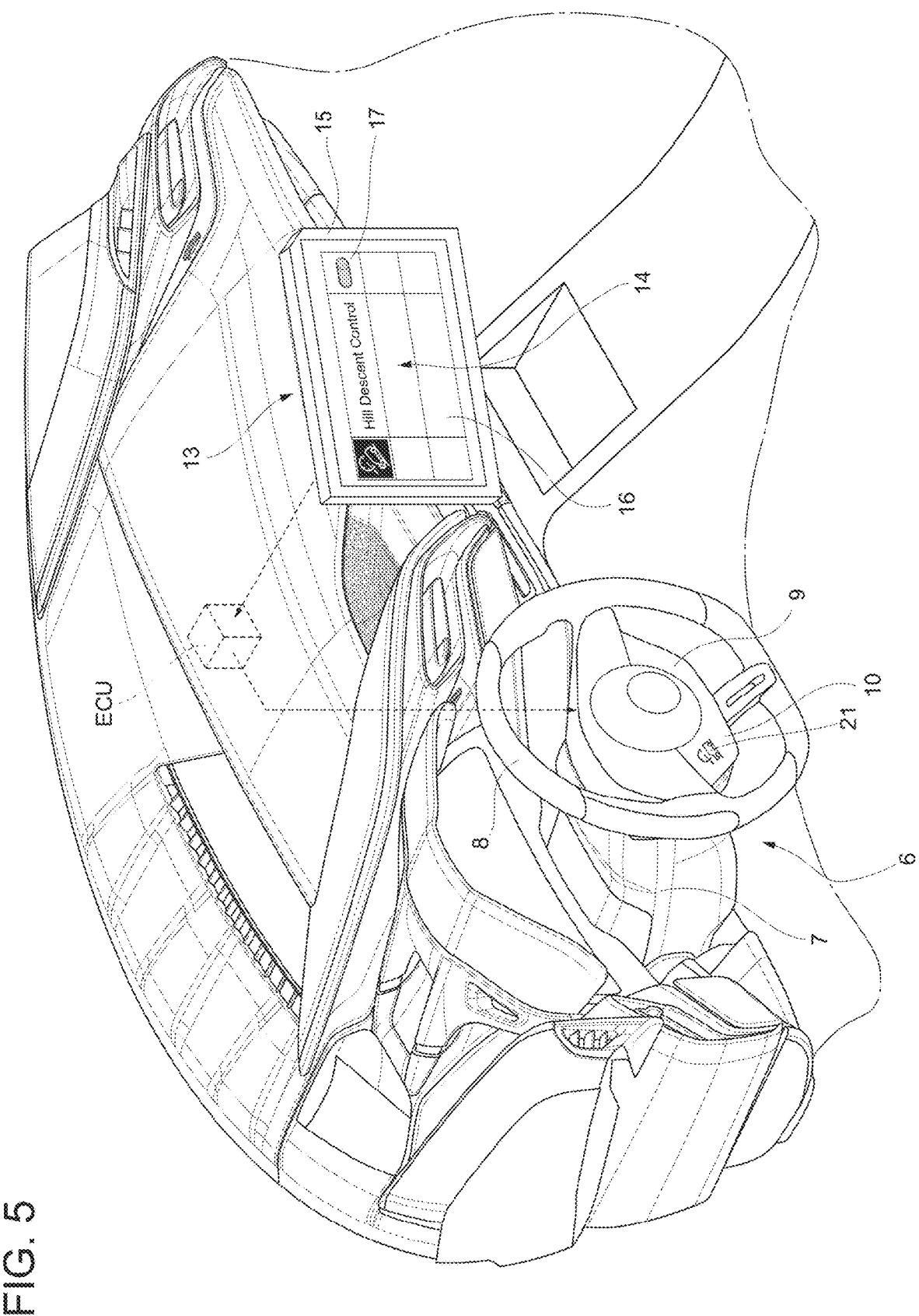
FIG. 5 is similar to FIG. 4 and shows the controller lit up following the activation of the hill descent control function.

Furthermore, preferably, the control unit ECU is configured to change a property of the indicator 21 when starting or performing the HDC function, in particular successfully (FIG. 5).

Specifically, the control unit ECU changes a light property of the indicator 21, for example the colour, although other light properties could also be changed alternatively or in addition, such as for example the light intensity or the blinking frequency of the light.

In the operation of the motor vehicle 1, the driver can trigger the enablement of the HDC function by using the control device 14 (block 100 of FIG. 6), in particular by scrolling through the setting menu 16 and by providing the control unit ECU with the enablement instruction through the controller 17.

Here, the control unit ECU enables the HDC function (block 101 of FIG. 6) and, in particular, simultaneously causes the indicator 21 to appear on the screen 9 at the touch-sensitive portion 10.

Figure 6:
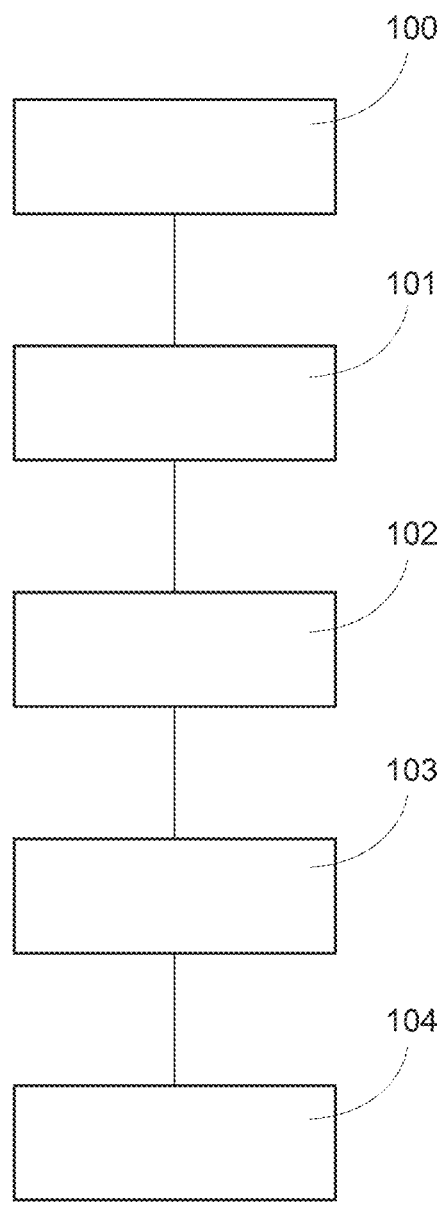
FIG. 6 is a block diagram representing steps of a process for enabling and activating the hill descent control function.

At this point, the driver touches the touch-sensitive portion 10, specifically indicated by the indicator 21, to trigger the start of the HDC function (block 102 of FIG. 6).

The control unit ECU detects the touch, namely the corresponding indicative signal, and proceeds with the start or execution of the HDC function (block 103 of FIG. 6).

The execution or start of the HDC function is successful, in particular, if the control unit ECU checks that all the necessary specific operating conditions are met (block 104 of FIG. 6).

At this point, if, in particular, the HDC function is successfully started, the control unit ECU changes the property of the indicator 21, so that the driver recognizes that the HDC function was started.

Based on the above, in particular based on the operation described above, the control unit ECU performs a process for enabling the HDC function, wherein the process comprises the steps of:

a. detecting the enablement of the HDC function by the control device 14, and only as a result thereof b. allowing the HDC function to be started by a touch of the driver on the touch-sensitive portion 10 of the screen 9 that is part of the steering wheel 6.

Furthermore, the process preferably comprises the step of causing an indicator 21 of the HDC function to appear on the touch-sensitive portion 10 in response to said enablement.

Furthermore, the process preferably comprises the step of changing a property of the indicator 21 when the HDC function is started, in particular successfully.

In general, any function performed by the control unit ECU can be a step of the process described above.

Owing to the above, the advantages of the motor vehicle 1 and of the process according to the invention are evident.

In particular, the screen 9 displays the indicator 21 only if the HDC function is actually enabled by the control device 14. In this way, an overcrowding of controls on the steering wheel 6 is avoided, except when it is actually necessary for those drivers who frequently use the HDC function.

Actually, the touch-sensitive portion 10 could advantageously be used for other purposes or functions when the HDC function is disabled.

In this way, the aesthetic of the steering wheel 6 remains clean and effective, without any reduction in the possible functions for the driver.

Finally, the process and the motor vehicle 1 according to the invention can be subjected to changes and variants, which, though, do not go beyond the scope of protection set forth in the appended claims.

For the sake of clarity, it should be pointed out that numerical adjectives such as first, second, third, etc. do not necessarily have a limiting value but are used for the sole purpose of avoiding misunderstandings. In other words, the adjective first does not necessarily imply that there also is a second object, just like the adjective second does not necessarily imply that there is a first object. In addition, distinct numerical adjectives could also refer to coincident or different objects, without losing generality.

The invention claimed is:

1. A motor vehicle, comprising:
   a steering wheel comprising a touch-sensitive portion;
   a user interface comprising a control device for commanding an enablement of a hill descent control function; and
   a control unit coupled to the steering wheel and the user interface, as well as configured to detect the enablement of the hill descent control function by the control device and to start the hill descent control function in response to a touch on the touch-sensitive portion by a driver of the motor vehicle, provided that the hill descent control function is enabled.

2. The motor vehicle according to claim 1, wherein the enablement of the hill descent control function can only and exclusively be performed by the control device.

3. The motor vehicle according to claim 1, wherein the touch-sensitive portion is part of a screen, the control unit being configured to cause an indicator of the hill descent control function to appear on the screen at the touch-sensitive portion in response to said enablement.

4. The motor vehicle according to claim 3, wherein the control unit is configured to change a property of the indicator when starting the hill descent control function.

5. The motor vehicle according to claim 1, wherein the user interface comprises an additional screen for displaying a setting menu forming part of the control device, in turn comprising a controller configured to be cooperative with the setting menu for the enablement of the hill descent control function.

6. The motor vehicle according to claim 5, wherein said controller is a touch command of the setting menu displayed by the further screen.

7. The motor vehicle according to claim 1, wherein the user interface is separate from the steering wheel.

8. A process for enabling a hill descent control function on a motor vehicle, the process comprising the steps of:
   detecting the enablement of the hill descent control function by a control device of a user interface of the motor vehicle, and only as a result thereof; and
   allowing the hill descent function to be started by a touch of a driver of the motor vehicle on a touch-sensitive portion of a screen forming part of a steering wheel of the motor vehicle.

9. The process according to claim 8, further comprising the step of making an indicator of the hill descent control function appear on the touch-sensitive portion in response to said enablement.

10. The process according to claim 9, further comprising the step of changing a property of the indicator when the hill descent control function is started.

11. A motor vehicle, comprising:
    a steering wheel comprising a touch-sensitive portion;
    a control device configured to command an enablement of a hill descent control function; and
    an electronic control unit configured to implement the hill descent control function once the command from the control device has been received and a touch on the touch-sensitive portion by a driver of the motor vehicle has been detected.

12. The motor vehicle of claim 11, wherein the steering wheel comprises a rotatable control, and wherein the touch-sensitive portion is embedded in the rotatable control.

13. The motor vehicle of claim 12, wherein the touch-sensitive portion comprises at least one capacitive sensor.

14. The motor vehicle of claim 12, wherein the touch-sensitive portion comprises at least one touch screen.

15. The motor vehicle of claim 11, wherein the control device comprises at least one touch screen.

16. The motor vehicle of claim 11, wherein the touch-sensitive control comprises an illuminatable indicator.

17. The motor vehicle of claim 16, wherein the electronic control unit is configured to illuminate the indicator in a first state when the hill descent control function has not been enabled and a second state when the hill descent control function has been enabled.

18. The motor vehicle of claim 17, wherein the first state comprises a first color and the second state comprises a second color that is different than the first color.

19. The motor vehicle of claim 16, wherein the electronic control unit is configured to illuminate the indicator in a first state when the hill descent control function has not been started and a second state when the hill descent control function has been started.

20. The motor vehicle of claim 19, wherein the first state comprises a first color and the second state comprises a second color that is different than the first color.

\* \* \* \* \*